(12) United States Patent
Lussi

(10) Patent No.: US 7,322,275 B2
(45) Date of Patent: Jan. 29, 2008

(54) COFFEE MACHINE

(75) Inventor: Andre Lussi, Jegensdorf (CH)

(73) Assignee: M.Schaerer AG, Moosseedorf (CH)

( * ) Notice: Subject to any disclaimer, the term of this patent is extended or adjusted under 35 U.S.C. 154(b) by 256 days.

(21) Appl. No.: 10/496,098

(22) PCT Filed: Nov. 18, 2002

(86) PCT No.: PCT/CH02/00618

§ 371 (c)(1),
(2), (4) Date: May 18, 2004

(87) PCT Pub. No.: WO03/043470

PCT Pub. Date: May 30, 2003

(65) Prior Publication Data

US 2005/0066820 A1 Mar. 31, 2005

(30) Foreign Application Priority Data

Nov. 20, 2001 (EP) ................................ 01811116

(51) Int. Cl.
A47J 31/24 (2006.01)
(52) U.S. Cl. ........................... 99/281; 99/286; 99/287; 99/289 R
(58) Field of Classification Search ................ 99/495, 99/516, 536, 279–290, 295, 297–300, 302 R, 99/305, 323.1; 426/433
See application file for complete search history.

(56) References Cited

U.S. PATENT DOCUMENTS 2,096,193 A * 10/1937 Mostertz ..................... 156/148
3,254,589 A * 6/1966 Little ......................... 99/289 R
4,083,295 A * 4/1978 Hollingsworth ............... 99/283
4,151,790 A * 5/1979 Spirk ........................... 99/281
4,204,465 A * 5/1980 Knecht ........................ 99/293
4,421,014 A * 12/1983 Vicker ....................... 99/289 P
4,575,615 A * 3/1986 Shigenobu et al. ........... 392/450
4,714,011 A * 12/1987 Ly ............................... 99/279
4,715,274 A * 12/1987 Paoletti ........................ 99/454
4,735,133 A * 4/1988 Paoletti ........................ 99/454
4,757,752 A * 7/1988 Robins et al. ................. 99/279
4,779,519 A * 10/1988 Giuliano ...................... 99/275
5,115,730 A 5/1992 Gockelmann (Continued)

FOREIGN PATENT DOCUMENTS

| CH | 673211 A5 * | 2/1990 |
| DE | 14 29 799 A | 1/1969 |
| EP | 0 676 163 A | 11/1995 |
| GB | 956 109 A | 4/1964 |
| NL | 8 401 201 A | 11/1985 |

Primary Examiner—Timothy F. Simone
(74) Attorney, Agent, or Firm—Pearne & Gordon LLP

(57) ABSTRACT

A coffee machine, particularly an espresso machine, comprising a brewing device (6) for producing and dispensing coffee via a coffee dispensing nozzle (11), as well as a hot water boiler (2) having a fresh water supply line (1) and a hot water line (10) coming out into a brewing chamber (5) of the brewing device (6), and a control unit (4). The coffee dispensing is controllable by said control unit (4). A heating element (13) is disposed on the hot water line (10) between the hot water boiler (2) and the brewing chamber (5), by means of which heating element the water flowing from the hot water boiler (2) into the brewing chamber (5) is able to be brought to brewing temperature. The brewing temperature can thereby be maintained at a virtually constant value whereby improving the quality of the coffee dispensed.

5 Claims, 3 Drawing Sheets

U.S. PATENT DOCUMENTS 5,158,793 A * 10/1992 Helbling ..................... 426/231
5,309,822 A *  5/1994 Sager ....................... 99/289 R
5,367,947 A * 11/1994 Lussi et al. ................... 99/287
5,490,447 A     2/1996 Giuliano

* cited by examiner

COFFEE MACHINE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The present invention relates to a coffee machine for producing and dispensing coffee beverages, in particular an espresso machine, having a housing in which are disposed at least one brewing device, a container for coffee beans, a grinding device connected to this container, a feed hopper for feeding the ground coffee beans into a brewing chamber of the brewing device, a stripper for the leached ground coffee, at least one hot water boiler, comprising a fresh water supply line and a hot water line coming out into a brewing chamber of the brewing device, a coffee dispensing nozzle and a control unit by means of which the dispensing of coffee is controllable.

(2) Description of Related Art

Coffee machines of this kind are known in many variations. Thus shown, for example, in GB-A-956 109 is a coffee machine of this kind. Coffee machines for restaurant businesses, coffee machines for industrial firms as well as coffee machines for households can be equipped according to this system.

In order to be able to obtain as good a quality of coffee as possible dispensed from the coffee machine, the temperature of the water in the brewing chamber which blanches the ground coffee should be at as constant a temperature as possible (for instance 95° C.). However it is a fact that the hot water located in the hot water boiler has a higher temperature since this water cools down on the way between the hot water boiler and the brewing chamber. This cooling down is not the same with each dispensing of coffee, however; in particular it depends on whether it is a first dispensing of coffee during which the lines and the valve through which the hot water will run as well as the brewing chamber are in a cold state, or whether these areas are warmed up owing to the passage of the hot water for previously dispensed coffee. Depending upon the situation, the brewing water can have too low or too high a temperature, which can affect the quality of the coffee dispensed.

An important factor which likewise affects the quality of the coffee to be dispensed is the pressure, with which the water is pressed through the brewing chamber. However this pressure can be kept at a constant value relatively well, using known means.

BRIEF SUMMARY OF THE INVENTION

The object of the invention is thus to improve a coffee machine such that the temperature of the water with which the ground coffee is blanched in the brewing chamber can be kept at a virtually constant value, regardless of whether a first coffee is dispensed after a break of longer duration or whether several coffees are dispensed one after the other.

This object is achieved according to the invention in that in the coffee machine between the hot water boiler and the brewing chamber a heating element is disposed on the hot water line, with which element the water flowing from the hot water boiler into the brewing chamber is able to be brought to brewing temperature, and in that the hot water line on which the heating element is disposed is equipped with means for adjusting the residual water.

Achieved thereby in an advantageous way can be that the hot water temperature in the hot water boiler is able to be kept at a lower level than in conventional coffee machines, the hot water to be led into the brewing chamber for producing a coffee is brought to the desired brewing temperature by this heating element before entering the brewing chamber, regardless of whether the hot water has cooled off more or less intensely en route between the hot water boiler and this heating element. With the means for draining off the residual water, the hot water line can be emptied after each dispensing of a coffee, whereby prevented is that, with longer standstill of the coffee machine, residual water remaining in particular between the heating element and the brewing chamber could cool down, and, when dispensing a coffee anew, be able to arrive in the brewing chamber in very cooled down state.

The heating element is preferably formed by a body composed of a material able to conduct heat, through which the hot water is able to be led, and in which a temperature-controllable heating and a temperature sensor are integrated. Through the use of the body, a certain heat storage in this heating element is achieved; with the temperature-controllable heating and the temperature sensor, the quantity of heat can be supplied which is necessary to bring the water running through the heating element to the desired brewing temperature.

A further preferred embodiment of the invention consists in the heating element being installed in the immediate vicinity of the brewing chamber after a valve, with which the supply of warm water into the brewing chamber is controllable for producing coffee and which is disposed in the hot water line, between the hot water boiler and the brewing chamber. A heat loss in the hot water led into the brewing chamber after passing through the heating element is thereby virtually avoided.

The means of draining off the residual water out of the hot water line are preferably formed by the valve, to which valve a residual water drain-off line is added, whereby the hot water line running between the valve and the brewing chamber is able to be connected to the residual water drain-off line and emptied by switching the valve. The residual water draining means can thereby be constructed in a simple way.

Preferably, a temperature sensor, with which the temperature of the hot water is determinable, can be disposed in the region of the exit of the hot water line from the heating element. The temperature sensor is connected to the control unit, whereby the heating of the heating element is controllable according to the measured temperature of the water. Thereby achieved in a simple way is that the water has a virtually constant temperature.

Instead of using a temperature sensor to control the water temperature, the heating element can also be activated according to parameter values, which parameter values are storable in memory means provided in the control unit. The temperature of the water able to be led into the brewing chamber can thereby be kept constant in an advantageous way without additional probes or sensors being necessary.

Embodiments of the present invention will be explained more closely in the following, by way of example, with reference to the attached drawing.

BRIEF DESCRIPTION OF THE SEVERAL VIEWS OF THE DRAWINGS

Shown are.

DETAILED DESCRIPTION OF THE INVENTION

Figure 1:
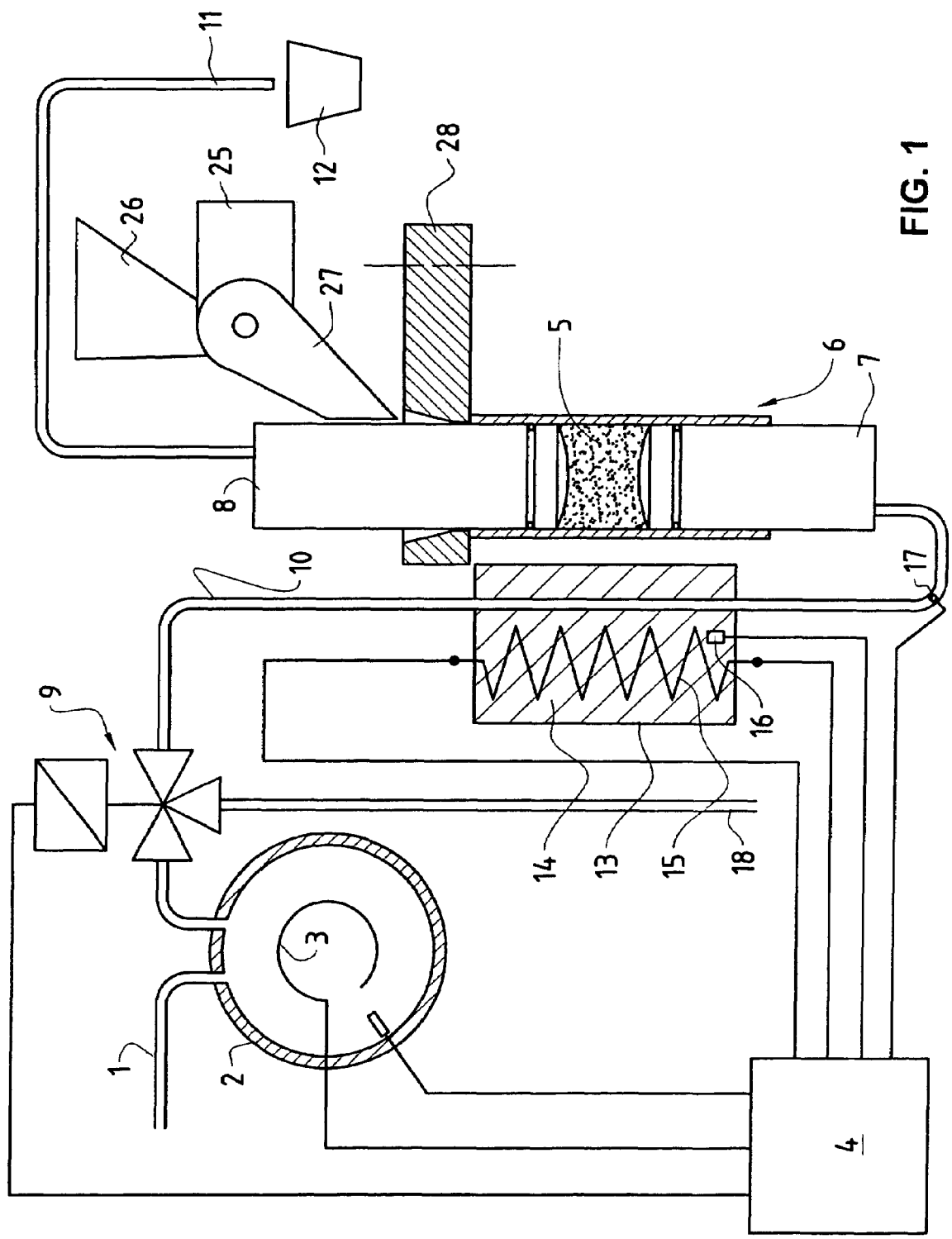
FIG. 1, is a schematic representation, the arrangement of the heating element in a coffee machine as a first embodiment example.

As can be seen from the schematic representation according to FIG. 1, of the essential elements of a coffee machine according to the invention, which elements are accommodated in a housing (not shown), fresh water is led via a fresh water supply line 1 into a hot water boiler 2 of the coffee machine. This can take place from a fresh water container or from a fresh water supply network (not shown) by means of a pump for instance. The water is heated in the hot water boiler by means of a heater 3, which is connected to a control unit 4. Via a temperature sensor 5, likewise connected to the control unit 4, the heater 3 is activated in such a way that the water in the hot water boiler 2 is kept at an approximately constant temperature. This temperature can correspond approximately to the desired brewing temperature of the water. The water in the hot water boiler is under pressure, for example at about 11 bar.

If coffee is dispensed, coffee beans, contained in a container 26, are supplied from this container 26 to a coffee mill 25 in a known way. These coffee beans are ground. Via a feed hopper 27, the freshly ground coffee is filled into the brewing chamber 5 of the brewing device 6, which is opened in the upper region by the piston 8 being driven out of the brewing chamber 5 and which is closed in the lower region by the piston 7. The brewing chamber 5 is then closed by the piston 8. Installed in the line coming out of the hot water boiler 2 is a valve 9, which is brought into the position in which the hot water from the boiler 2 is able to arrive in the hot water line 10. This hot water line 10 leads the hot water via the piston 7 into the brewing chamber 5, where the ground coffee is blanched. By means of the piston 8 the brewed coffee reaches the coffee dispensing nozzle 11 and from there the coffee cup 12.

Just before the brewing chamber 5 the hot water line 10 passes through a heating element 13. This heating element 13 is formed by a body 14 made up of a material capable of heat conduction, for example of aluminum (aluminium). Integrated into this body 14 is a temperature-controllable heating 15 and a temperature sensor 16, which are connected to the control unit 4. Furthermore disposed in the region of the exit of the hot water line 10 out of the heating element 13 is a temperature sensor 17, with which the temperature of the hot water is able to be determined. When dispensing a coffee, the heating 15 of the heating element 13 is activated by the control unit 4, and brings the body 14 quickly to a temperature corresponding to the brewing temperature of about 95° C. When the water flows through the hot water line 10, its temperature is measured by the temperature sensor 16; on the basis of this measured temperature the heating element 13 is controlled by the control unit 4 in such a way that the brewing temperature of the water which is led into the brewing chamber 5 remains virtually constant.

When the required amount of water needed for the coffee dispensing has passed through the valve 9, which is determined in a known way through a flow meter, the control unit 4 brings about a closing of the valve 9, in addition to the turning off of the pump. The valve 9 is then switched in such a way that the hot water line 10 is connected to a residual water drain-off line 18, whereby the water located in the hot water line 10 is drained in a known way into a residual water container (not shown). Prevented thereby is that water remains in the hot water line 10 and can cool down during longer non-use of the coffee machine, in particular in the region of the hot water line 10 situated between the heating element 13 and the brewing chamber 5. If the hot water line 10 were not to be emptied, then during the next dispensing of coffee, this cooled-down water would first come into contact with the ground coffee to be blanched, whereby the quality of the coffee dispensed could be affected.

After dispensing of a coffee, the brewing chamber 5 is opened in a known way in that the piston 8 is driven out of the brewing chamber 5. The piston 7 subsequently pushes the leached ground coffee to the edge of the brewing chamber 5; these are then led away in a known way by a stripper 28 and are brought into a collecting container (not shown).

Ensured with this device is that the water arriving in the brewing chamber 5 has practically always the same brewing temperature, regardless of whether a normal coffee with a larger amount of water or an espresso with a relatively small amount of water is dispensed, and also regardless of whether it is the first coffee or espresso coffee in each case which has been dispensed after a longer interruption of the coffee machine or whether several coffees have been dispensed already beforehand. A consistently good quality of the coffee dispensed is thereby ensured.

Figure 2:
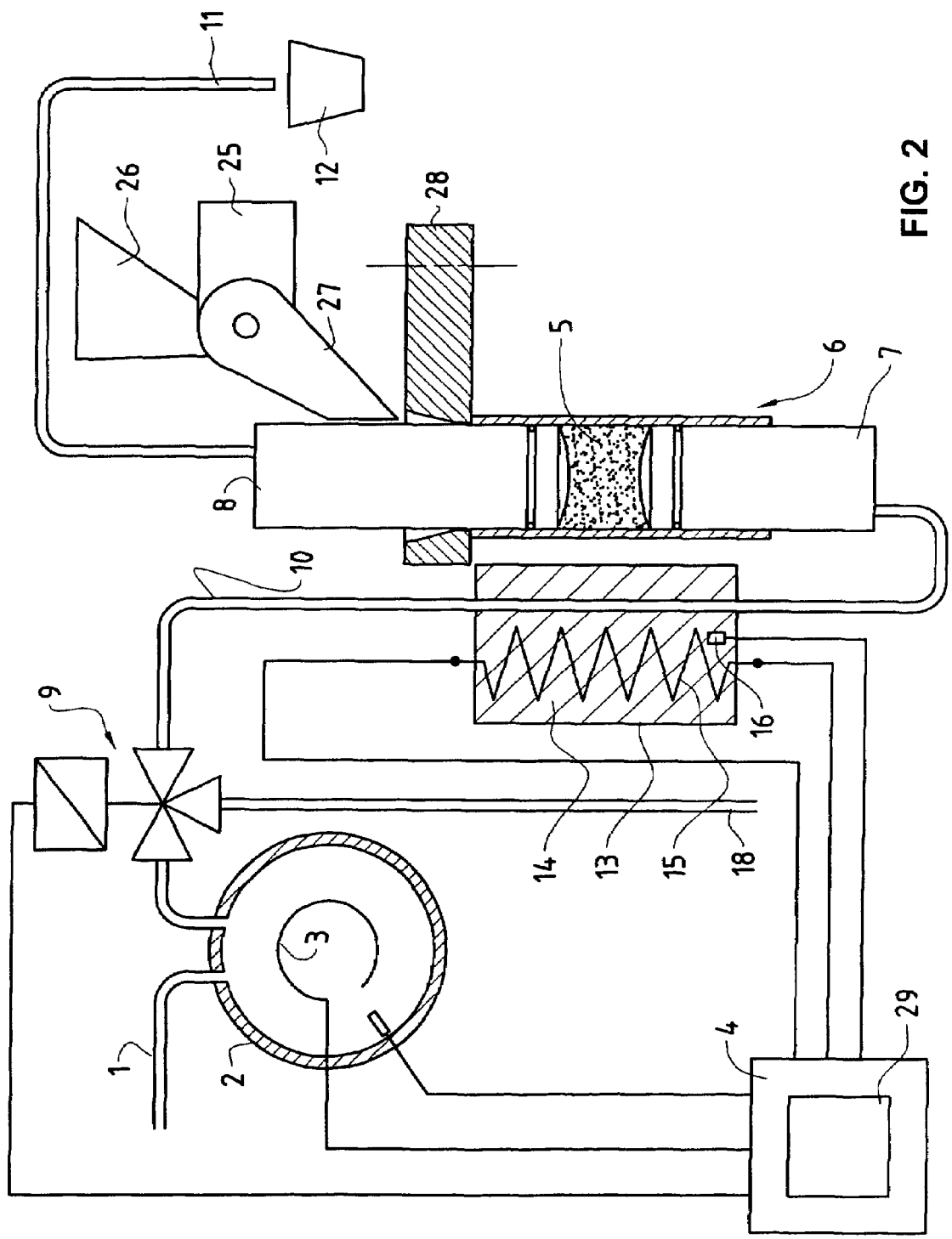
FIG. 2, is a schematic representation, the arrangement of a heating element in a coffee machine according to a second embodiment example.

Visible in a schematic representation in FIG. 2 is a practically identical coffee machine as in FIG. 1. In this figure the elements have been given the same reference numerals as the corresponding elements according to FIG. 1. The only difference is that the temperature sensor 17 (FIG. 1) has been omitted in this embodiment example.

The dispensing of coffee takes place in an identical manner as has been described with respect to FIG. 1, whereby the heating 15 is activated by the control unit 4 on the basis of parameter values, which parameter values are storable in memory means 29 in the control unit 4 in a known way. These parameter values are, on the one hand, empirical values as to how the elements passed through by the hot water cool down over time, and how the heating takes place depending upon the amount of water led through. Further parameter values are whether a normal coffee or an espresso coffee is dispensed, what time has passed by since the last dispensing of a coffee or an espresso coffee until the dispensing again of a coffee or espresso coffee. Based on these parameter values the control unit calculates what quantity of heat is to be delivered by the heating element 14 to the water passing through this heating element 14, and controls accordingly the heating 15 of the heating element 14. The parameter values which are empirical values have been determined in long-term tests on a coffee machine equipped with the necessary measuring means.

With the coffee machines designed according to the invention it becomes possible for the brewing water arriving in the brewing chamber, with which the ground coffee is blanched and the coffee thereby produced, to have a substantially constant temperature, whereby the quality of the coffee is able to be improved.

Figure 3:
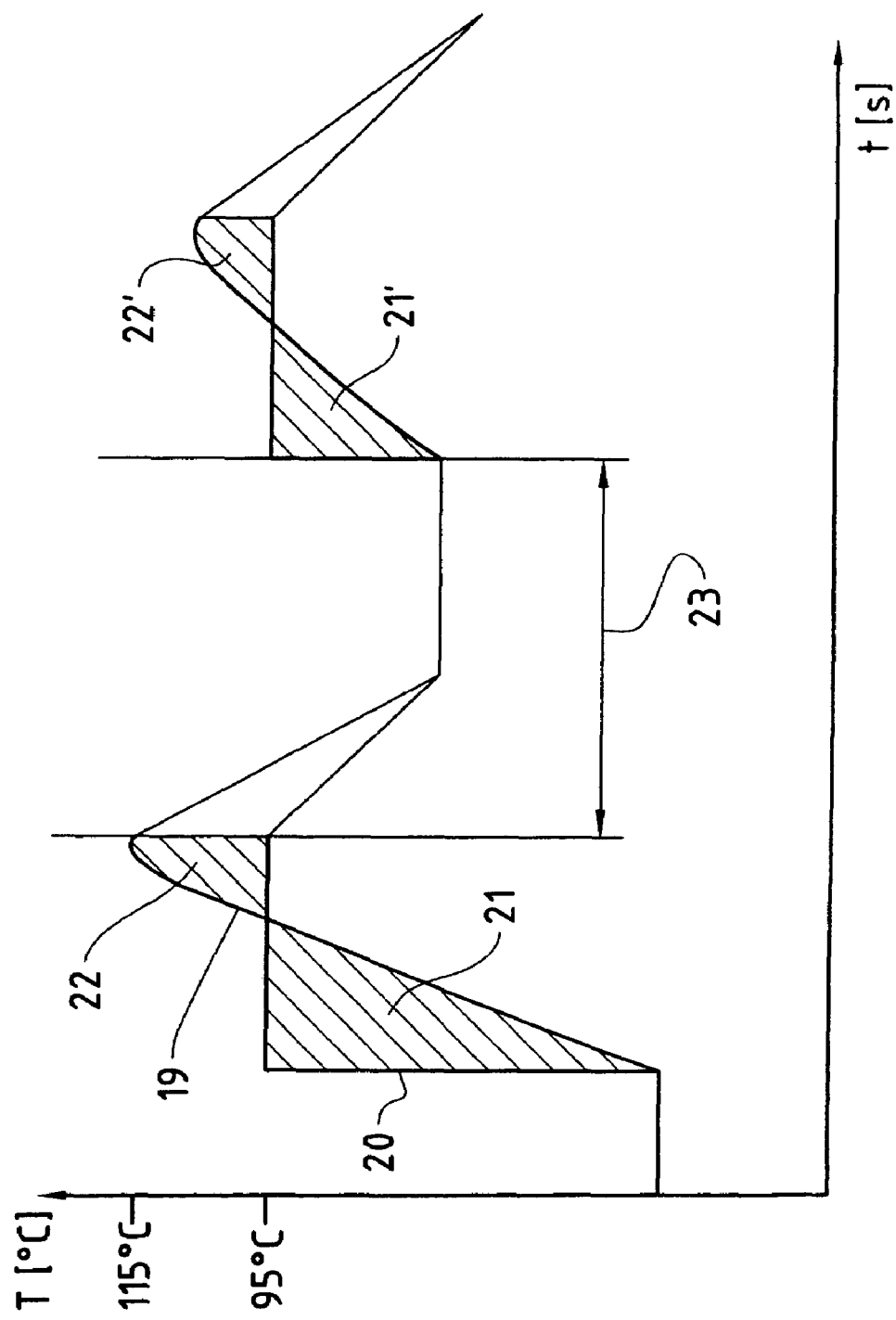
FIG. 3, is a graphic representation, the course of the temperature of the water running into the brewing chamber in a conventional coffee machine and in a coffee machine according to the invention.

From the time-temperature diagram, shown in FIG. 3, the curve 19 shows the temperature course of the brewing water when entering the brewing chamber of a conventional machine, while curve 20 shows the temperature course of a coffee machine designed according to the invention. With the conventional machine (curve 19), the water led first into the brewing chamber has too low a temperature since the elements in the hot water line first have to be warmed up. In the course of the brewing process the temperature rises and exceeds the optimal brewing temperature of 95° C., since the water in the hot water boiler has a temperature higher than this 95° C., in order to be able to reach the brewing temperature at all.

With the coffee machine according to the invention, the water is heated by the heating element to 95° C. before entering the brewing chamber, and is kept constant at this temperature, as can be learned from the curve 20. With the conventional coffee machine, therefore, a first portion of the coffee is brewed at too low a temperature, shown by the hatched area 21, whereas the last portion of the coffee is brewed at too high a temperature, shown by the hatched area 22. If after a certain time, indicated by the double arrow 23, a new coffee is dispensed in each case, the temperature differences of the brewing water have decreased in the conventional machine since the elements passed through by the hot water have not yet cooled down all too much. Nevertheless one still obtains a portion of coffee brewed too cold and a portion of coffee brewed too hot, as is indicated by the areas 21' and 22'.

With the coffee machine according to the invention, on the other hand, the optimal brewing temperature is maintained.

The invention claimed is:

1. Coffee machine for producing and dispensing coffee beverages, in particular an espresso machine, which has a housing in which are disposed at least one brewing device (6), a container (26) for coffee beans, a grinding device (25) connected to this container (26), a feed hopper (26) for feeding the ground coffee into a brewing chamber (5) of the brewing device (6), a stripper (28) for the leached ground coffee, at least one hot water boiler (2) having a fresh water supply line (1) and a hot water line (10) coming out into the brewing chamber (5) of the brewing device (6), a coffee dispensing nozzle (11) and a control unit (4) by means of which the dispensing of coffee is controllable, characterized in that between the hot water boiler (2) and the brewing chamber (5) a heating element (13) is disposed on the hot water line (10), with which element the water flowing from the hot water boiler (2) into the brewing chamber (5) is able to be brought to brewing temperature, and in that the hot water line (10), on which the heating element (13) is disposed, is equipped with means (9, 18) for draining off the residual water, said heating element (13) comprising a body (14) composed of a material able to conduct heat, through which the hot water is able to be led, and in which a temperature-controllable heating (15) and a temperature sensor (16) are integrated, said heating element (13) being installed in the immediate vicinity of the brewing chamber (5) after a valve (9), with which the supply of warm water into the brewing chamber (5) is controllable for producing coffee and which is disposed in the hot water line (10), between the hot water boiler (2) and the brewing chamber (5).

2. Coffee machine according to one of the claim 1, characterized in that the means of draining off the residual water in the hot water line (10) are formed by the valve (9), to which valve a residual water drain-off line (18) is added, whereby the hot water line (10) running between the valve (9) and the brewing chamber (5) is able to be connected to the residual water drain-off line (18) and emptied by switching the valve (9).

3. Coffee machine according to one of the claim 1, characterized in that a temperature sensor (17), with which the temperature of the hot water is determinable, is disposed in the region of the exit of the hot water line (10) from the heating element (13).

4. Coffee machine according to claim 3, characterized in that the temperature sensor (17) is connected to the control unit (4), by means of which the heating (15) of the heating element (13) is controllable according to the temperature measured.

5. Coffee machine according to one of the claim 1, characterized in that the heating (15) of the heating element (13) is able to be activated according to parameter values, which parameter values are storable in memory means (29) provided in the control unit (4).

* * * * *